Feb. 27, 1934.   J. H. CLARKE   1,949,072
METHOD OF MAKING MOLDED ARTICLES FROM PLASTIC MATERIALS
Filed April 25, 1931
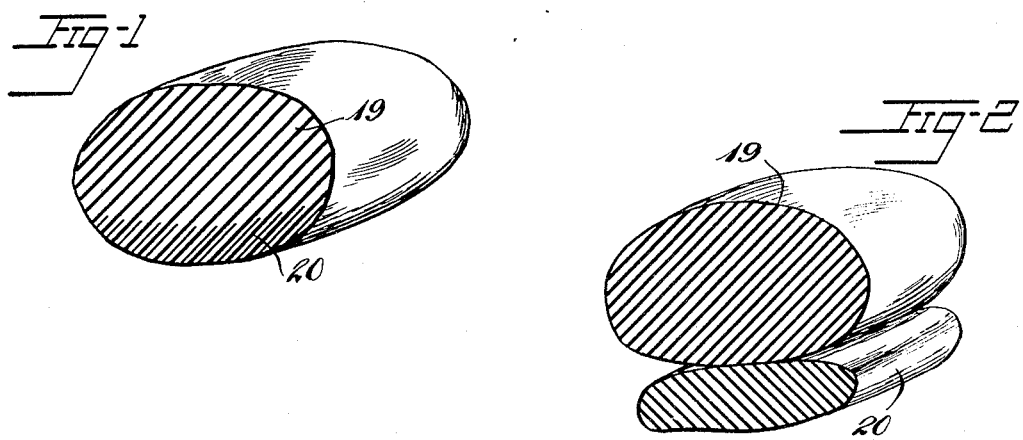
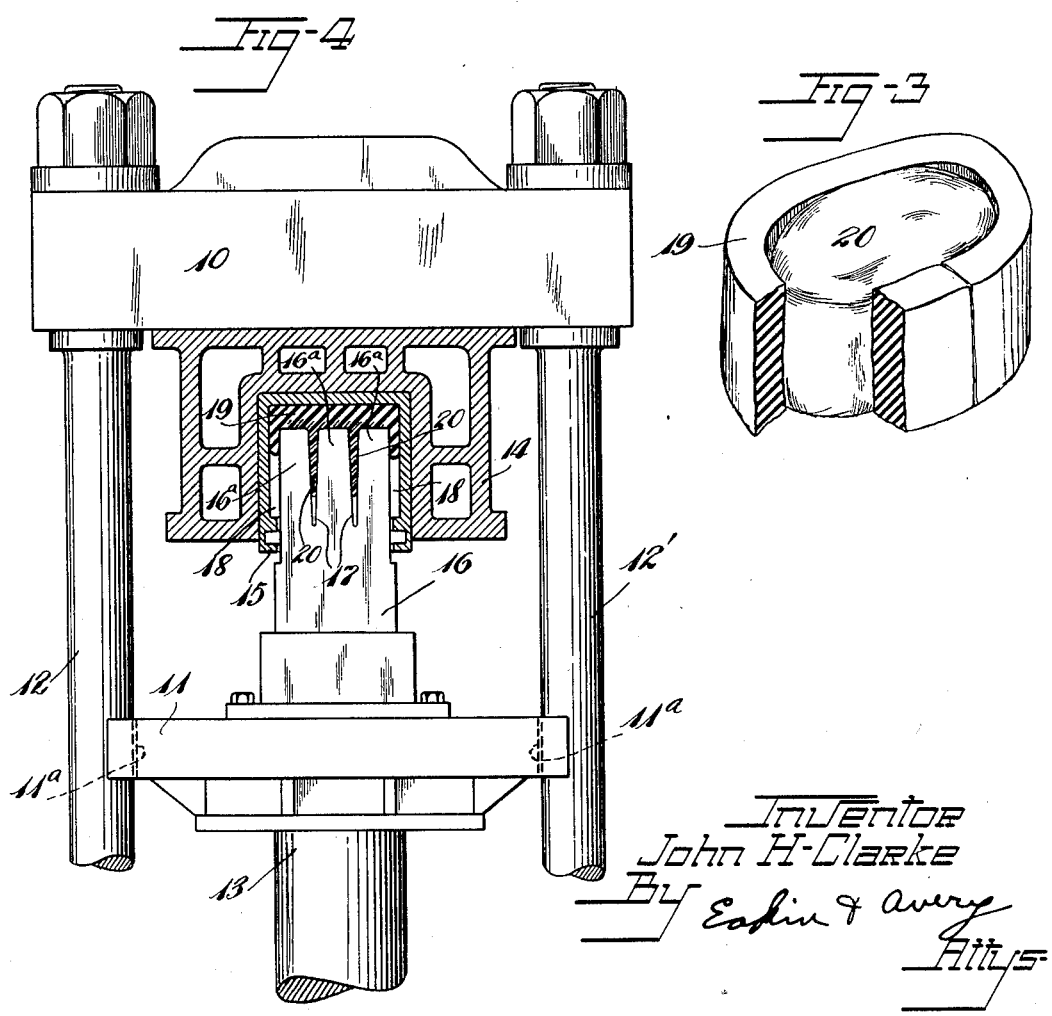
Inventor
John H. Clarke
By Eakin & Avery
Attys.

Patented Feb. 27, 1934

1,949,072

UNITED STATES PATENT OFFICE 1,949,072

METHOD OF MAKING MOLDED ARTICLES FROM PLASTIC MATERIALS

John H. Clarke, Watertown, Mass., assignor to The B. F. Goodrich Company, New York, N. Y., a corporation of New York Application April 25, 1931. Serial No. 532,737

11 Claims. (Cl. 18—55)

This invention relates to a method of making molded articles from plastic materials and is especially useful in the production of battery containers and similar articles from bituminous compositions.

In the molding of plastic materials, when portions of the articles to be produced are of different thicknesses, the plastic material, subjected to pressure caused by closing of the mold, flows along the wider mold spaces in advance of filling the thin spaces. This results in the trapping of air in the thin spaces and the production of flow lines and poorly knit places in thin sections of the article.

The objects of this invention are to produce a molded article of uniform unit strength and free from flow lines and other defects and to provide a simple and inexpensive method of producing the same.

In the accompanying drawing, Fig. 1 is a cross-sectional perspective view of a section of one form of biscuit such as is employed in practicing my method.

Fig. 2 is a similar view of another form of biscuit such as is employed in practicing the invention.

Fig. 3 is a perspective view of a third form of biscuit suitable for use in practicing the invention, part of the material being broken away.

Fig. 4 is an elevation, partly in section, of a hydraulic press with a mold mounted therein for forming a plastic article, the female mold part being shown in section with a partially formed article also in section, the lower portion of the press being broken away.

Referring to the drawing, the press illustrated in Fig. 4 is of the conventional type consisting of an upper platen 10 and a lower platen 11 between which are mold members adapted to perform the pressing operation. The upper platen 10 is supported by rods 12, 12' from a base (not shown), on which is mounted a hydraulic cylinder (not shown) adapted to force a ram 13 and platen 11 toward platen 10. Platen 11 is formed with guide-grooves 11a for engaging the rods 12, 12' and guiding the platen 11.

A mold box 14 is suspended from the upper platen and frictionally supports a female mold 15 which is conventionally shown, it being understood that it may consist of separable plates assembled and normally held in the mold box by any suitable means. Mold box 14 is provided with connecting chambers between its inner and outer surfaces whereby it may be heated or cooled by fluids circulated through the chambers and supplied by suitable pipe connections.

The lower platen 11 carries a male mold part 16. The particular mold illustrated is adapted to form a three-cell battery container and the male mold member is notched as at 17 to provide relatively narrow spaces for forming relatively thin cross partitions or walls in the container, the spaces 17 separating the upper part of the core into cell-forming cores 16a which are spaced from the mold 15 by relatively wide spaces for forming the relatively thick outer walls of the battery container.

In the ordinary use of the mechanism described a solid lump or biscuit of plastic compound of a bituminous nature and of volume approximately equal to the article to be produced is laid on top of the cores 16a with the lower platen lowered and the platen 11 is then raised by hydraulic pressure. As the biscuit is subjected to pressure it flows until it completely fills the cavity. As the spaces 18 are relatively wider than the spaces 17 they offer less frictional resistance to flow of the plastic material, and consequently the material fills the spaces 18 in advance of filling the spaces 17 and spaces 17 may be entirely surrounded with plastic material before the air has been displaced therefrom. This results in flow lines, and imperfectly formed partitions.

I have discovered that by using a biscuit in which different portions of the biscuit have different plasticities, and by so arranging the materials of different plasticities in the mold that the material of higher plasticity is adjacent to the parts of the mold which it is desirable to have filled in advance of the complete filling of the mold, I reduce the percentage of defective articles produced and secure articles having more uniform strength.

In practicing my invention two different plastic compounds may be prepared, assembled, and placed in the mold and subjected to flowing pressure; a single plastic compound may be formed in a biscuit and so treated as to increase the plasticity of a certain determinate portion thereof and subjected to the molding operation; or a single plastic compound may be formed in a biscuit and so treated as to decrease the plasticity of certain determinate portions thereof and then subjected to the molding operation.

The production of stocks of different plasticities may be accomplished by the inclusion of more softener in one compound than in the other or by varying the amounts of fibrous material used in the several compounds, or one part of the biscuit may be produced from the same compound as the other but prepared at a higher temperature or by longer or shorter working of the material, or by longer ageing of one part after mixing.

In Fig. 2 I have illustrated one form of biscuit in which the part 19 is so prepared that its plasticity is lower than the part 20 on which it is superimposed. When such a biscuit is placed in a mold such as shown in Fig. 4, the part 20 is placed directly over the cores 16a and as the mold closes the more plastic stock 20 will flow into the spaces 17 in advance of the flow of the stock 19 into the spaces 18. This results in the air being expelled from spaces 17 before exit thereof is shut off by the advancing of the material in space 18.

Another type of biscuit which I find suitable for carrying out my method is illustrated in Fig. 3 of the drawing. In this form the less plastic material 19 is wrapped around the lateral edges of the biscuit 20 of more plastic stock, forming a collar or dam of less plastic stock circumscribing the more plastic material. The biscuit formed as shown in Fig. 3 is inserted in the mold so that one of the exposed faces of the more plastic stock 20 contacts with the cores 16ª. The encircling band of less plastic material prevents too rapid flow down the side-wall spaces 18 while permitting free flow of the more plastic material into the spaces 17 in advance of flow into the space 18 as illustrated in Fig. 4.

In Fig. 1 I have illustrated a biscuit formed of a single material which has been so treated that the portion 19 of the biscuit is less plastic than the portion 20 of the biscuit. The action of such a biscuit in the mold is like the action of the biscuit shown in Fig. 2. In order to provide zones of more plastic material in such a biscuit I prefer to subject a biscuit of uniform plasticity to local heating to soften the desired zone. This may be done by inserting the biscuit in an oven provided with heating means so located with respect to the biscuit as to warm one side thereof to a higher temperature than the other.

I claim:

1. The method of making a molded article having walls of different thicknesses which comprises providing a composite biscuit of plastic material whose plasticity is different in different parts thereof, introducing said biscuit between confining mold members in such relation thereto as to restrict flow of the more plastic portion to the portions of the mold members defining the thinner walls of the article, and applying pressure to the mold to cause the more plastic portion of the biscuit to flow into parts of the mold adapted to form the thin portions of the article in advance of the flow of the less plastic portions of the biscuit.

2. The method of making a molded article having walls of different thicknesses which comprises introducing stocks of different plasticities between confining mold members in such relation to each other and to the mold members as to expose the more plastic material only to the narrow wall-defining portions of the mold and applying pressure to the mold to cause the more plastic stock to flow into the parts of the mold adapted to form the thin portions of the article in advance of the flow of the less plastic stock.

3. The method of making a molded article having walls of different thicknesses which comprises introducing stocks of different plasticities between confining mold members, so arranging the stocks as to cause the less plastic stock to block the entrance of the more plastic stock to those portions of the mold adapted to form thick walls, applying pressure and thereby filling the parts of the mold adapted to form the thin walls in advance of the filling of the remainder of the mold.

4. The method of making a molded container having relatively thin integral cross-partitions which comprises introducing stock of different plasticities between confining mold members with the more plastic stock exposed to the mold parts defining the cross partitions, and by relative movement of said mold members filling the spaces provided to form thin partitions with stock of high plasticity and the other portions of the mold with stock of lower plasticity.

5. The method of making a molded container having relatively thin integral cross-partitions which comprises introducing plastic material of different plasticities between confining mold members, and by restricting the flow of the more plastic material to the parts of the mold which define the thicker walls of the container and by relative movement of said members filling the spaces provided to form the partitions in advance of the filling of the other parts of the mold.

6. The method of making a molded container having relatively thin integral cross-partitions which comprises so introducing plastic material of different plasticities between confining mold members as to obstruct flow of the more plastic material to the outer walls of the container, and by relative movement of said members causing the more plastic material to flow in such a direction as to first fill the partition forming spaces and thereafter with the less plastic material to fill the outer wall-forming spaces.

7. The method of making a molded article having walls of different thicknesses which comprises forming a biscuit of plastic material of different plasticities arranged in determinate relation, introducing said biscuit in such relation between mold members so as to cause the more plastic material to lie adjacent the thin wall defining portions of the mold and by relative movement of said members so causing pressure to be applied to said biscuit as to cause the more plastic portions thereof to fill the thin-wall-forming spaces in advance of the flow of the less plastic material.

8. The method of making a molded article as defined by claim 7 in which the less plastic material is formed as a ring which surrounds the more plastic material.

9. The method of making a molded article having thick and thin portions, said method comprising forming a biscuit of plastic material, treating the biscuit to provide zones of material having different degrees of plasticity, and so confining the biscuit between approaching mold members as to cause the more plastic portion of the biscuit to lie adjacent the thin-wall defining portion of the mold, thereby to induce a flow of the more plastic zone to form thin portions of the article in advance of flow of the entire mass of the biscuit.

10. The method of making a molded article having relatively thick and thin portions which comprises forming a biscuit of plastic material whose plasticity is different in different parts thereof, placing the biscuit in a mold with the more plastic portion contacting with that part of the mold which is adapted to form the thin portion of the article, and applying confining pressure to the biscuit to cause flowing of the more plastic portion in advance of the flowing of the entire biscuit.

11. The method of making a molded article having relatively thick and thin portions which comprises providing a biscuit of plastic material one portion of which has a higher temperature than the remainder thereof, inserting the biscuit in a mold with the warmer portion thereof contacting with the thin-wall-forming portion of the mold, and applying pressure to said biscuit to cause the warmer portion to flow in advance of the colder portion of the biscuit.

JOHN H. CLARKE.